G. S. RODD.
STEERING WHEEL INDICATING ATTACHMENT FOR MOTOR VEHICLES.
APPLICATION FILED JAN. 8, 1918.
1,316,866.
Patented Sept. 23, 1919.
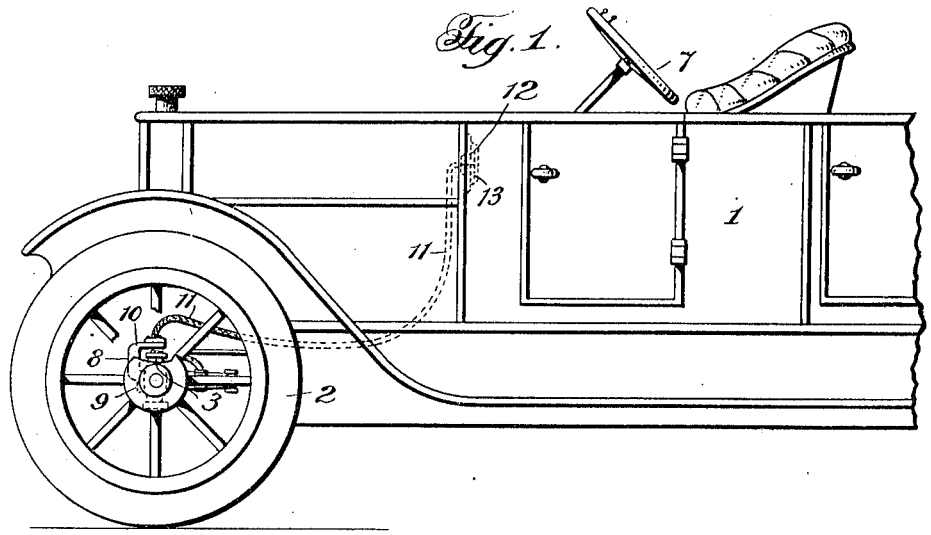
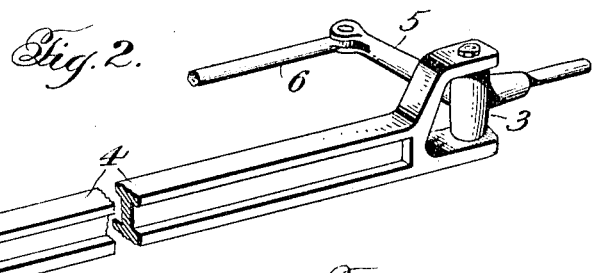
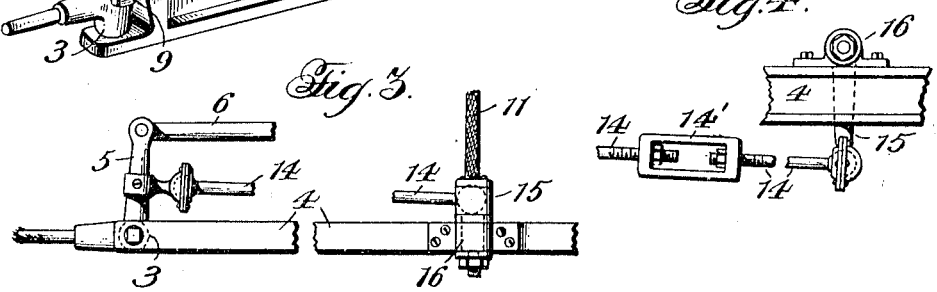
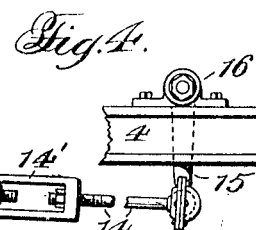
Witness:
Jas. E. Hutchinson
Inventor:
George S. Rodd,
By Joseph H. Milans
Attorney

UNITED STATES PATENT OFFICE.

GEORGE S. RODD, OF HOUGHTON, MICHIGAN.

STEERING-WHEEL-INDICATING ATTACHMENT FOR MOTOR-VEHICLES.

1,316,866.  Specification of Letters Patent.  Patented Sept. 23, 1919.

Application filed January 8, 1918. Serial No. 210,904.

*To all whom it may concern:*

Be it known that I, GEORGE S. RODD, a citizen of the United States, residing at Houghton, in the county of Houghton and State of Michigan, have invented certain new and useful Improvements in Steering-Wheel-Indicating Attachments for Motor-Vehicles, of which the following is a specification, reference being had therein to the accompanying drawing.

This invention relates to improvements in a steering wheel indicating attachment for motor vehicles.

The object of the invention is to provide an attachment for operating an indicator of any approved form located at a point visible to the driver of the machine for instantly indicating the angular position of the steering wheels.

A further object of this invention is to provide an attachment of this general character which is capable of application to any of the steering mechanisms now in use and may be readily applied thereto, whereby a movement of the steering arms or knuckles correspondingly actuates the indicating operating device through the medium of a flexible shafting attached to an operating part mounted for pivotal movement with one of the knuckles at its axis of rotation to turn therewith.

More specifically the invention embodies an operating part provided with a portion to which is attached an operating shaft for the indicator. The shaft is secured to the operating part fixedly at its axis of rotation to be rotated therewith.

In the accompanying drawings I have illustrated the preferred embodiments of the invention in which, Figure 1 illustrates a portion of a motor vehicle having applied thereto the improved indicating apparatus.

Fig. 2 is a detail view of said apparatus, and

Figs. 3 and 4 are slightly modified forms.

Referring now more particularly to the drawings wherein like reference characters designate corresponding parts, the numeral 1 designates a motor vehicle of any conventional type having the usual front steering wheels 2 journaled on the knuckles 3, which knuckles in turn are pivoted to the axle 4 as is usual in motor vehicle constructions. The knuckles 3 are provided with the usual spindles 5 connected at their outer or free ends by the steering rod 6 operating to move said steering wheels in unison and actuated by the hand operated steering wheel 7.

Attached to one of the knuckles 3, preferably intermediate its ends, is an angular part or member 8 vertically disposed having one portion 9 lying along the knuckle and suitably secured, from whence said crank portion is bent outwardly, at right angles to said part 9 a slight distance then extending upwardly in a vertical plane and provided at its upper end with a return bend part 10 overlying the pivot point on the knuckle. The part 10 is provided with a convenient means for receiving an attachment to the end of a flexible shafting 11 at its axis of rotation to be rotated thereby said shafting extending upwardly to the indicator 12, suitably provided with a dial marked in any approved fashion and over which a pointer 13 connected with the flexible shafting moves. When the steering wheels are directed straight ahead and the knuckles lie in alinement with the axle, the pointer will indicate on the dial to the operator of the machine that the wheels are in such a position, but if the wheels are slightly deflected the knuckles will be correspondingly turned and this turning movement causes a swinging of the part 8 thereby imparting to said flexible shafting 11 connected thereto at its axis a slight rotary movement to correspondingly move the point over the dial instantly indicating that the wheels are not in their alinement with the rear wheels, but are deflected. While the crank part or member 8 is preferably of a construction as herein described it will of course be understood that any other suitable attachment which is capable of being applied to the steering wheel knuckles may be employed for imparting this movement to the indicating dial.

In Fig. 3 a modified form of device is disclosed wherein a connecting arm 14 is attached to one of the rearwardly extending steering arms 5, said rod 14 projecting substantially parallel with the axle a portion of its length and there attached to a depending crank 15 pivotally mounted at one end upon the axle by the bearing 16, the lower end of this crank being connected to the outer end of the member 14. The member 14 is preferably adjustable in length for various reasons and a turn buckle 14' is usually employed to permit of this adjustment. The upper end of the crank 15 at its pivot point or axis is rigidly fastened to the end of the flexible shafting and it will therefore be seen that upon a swinging movement of the crank in a vertical plane the flexible shafting is given a slight rotary action during such movement of the crank 15 about its axis which is transmitted to the pointer through the flexible shaft moving the same over the dial thereby designating the position of the steering wheels. This construction is found preferable at times, involving a few parts and it will be seen that the same can be easily applied to any steering mechanism now in use without materially changing the same, and the action is very similar to that obtained by the use of the construction defined in Fig. 1 in that the shaft in each instance is attached to the operating element at its axis.

While I have described only the preferred embodiment of the invention, I wish it to be understood that many changes may be made without departing from the spirit thereof and falling within the scope of the appended claims.

What I claim is:—

1. The combination with the front axle of a vehicle, of knuckles therefor and steering wheels on said knuckles, an indicator, a member carried by one of the knuckles and having a portion extending over the axis of the knuckle and a flexible shafting connected to said part at the axis of rotation and to said indicator.

2. The combination with the front axle of a vehicle, of pivoted knuckles therefor, steering wheels on said knuckles and steering mechanism for said wheels, a member carried by one of said knuckles and having a horizontal part extending over the axis of its steering knuckle, an indicator and a flexible shafting attached to the horizontal part of the member for rotation therewith and having a driving connection with the indicator.

3. The combination with a vehicle having a front axle and steering knuckles, steering wheels on said knuckles, an indicator, a member mounted for movement with said knuckles, an operating shaft connected with the member at its axis of rotation for rotation therewith and with the indicator, said member being mounted on a knuckle and having a part to which the flexible shaft is attached overlying the axis of the knuckle.

4. The combination with the front axle of a vehicle, of knuckles therefor and steering wheels on said knuckles, an indicator, a member carried by one of the knuckles and having a portion extending over the axis of the knuckle and a flexible shafting connected to said part at the axis of rotation and to said indicator, the portion of said member having a socket therein to which the knuckle is attached.

5. The combination with a vehicle having a front axle, of steering knuckles and wheels thereon, an indicator, a movable vertically disposed member mounted for movement with the knuckles and a flexible shaft fixedly attached to the member at its axis of rotation for rotation therewith and with the indicator.

6. The combination with a vehicle having a front axle, of steering knuckles and wheels thereon, an indicator, a movable vertically disposed member mounted for movement with the knuckles and a flexible shaft fixedly attached to the member at its axis of rotation for rotation therewith and with the indicator, said member being carried by one knuckle and having a horizontal part to which the flexible shaft is attached extending over the axis of its knuckle.

In testimony whereof I hereunto affix my signature in the presence of two witnesses.

GEORGE S. RODD.

Witnesses:
ARTHUR L. RODD,
CECIL M. LIGHT.

Copies of this patent may be obtained for five cents each, by addressing the "Commissioner of Patents, Washington, D. C."